(12) United States Patent
Nair (10) Patent No.: US 8,227,013 B2
(45) Date of Patent: Jul. 24, 2012

(54) DIETARY NUTRITIONAL SUPPLEMENTS FOR HEALTHCARE

(76) Inventor: Vijaya Nair, Bedford, NY (US)

( * ) Notice: Subject to any disclaimer, the term of this patent is extended or adjusted under 35 U.S.C. 154(b) by 440 days.

(21) Appl. No.: 11/824,213

(22) Filed: Jun. 29, 2007

(65) Prior Publication Data

US 2009/0004334 A1 Jan. 1, 2009

(51) Int. Cl.
*A23L 1/29* (2006.01)

(52) U.S. Cl. ........ 426/648; 426/615; 426/634; 424/734; 424/756; 424/757

(58) Field of Classification Search ........................ None
See application file for complete search history.

(56) References Cited

U.S. PATENT DOCUMENTS

| | | | | |
|---|---|---|---|---|
| 3,642,490 | A * | 2/1972 | Hawley et al. ................. | 426/459 |
| 5,536,506 | A * | 7/1996 | Majeed et al. ................. | 424/464 |
| 5,861,415 | A * | 1/1999 | Majeed et al. ................. | 514/321 |
| 5,904,924 | A * | 5/1999 | Gaynor et al. ............ | 424/195.17 |
| 5,952,032 | A * | 9/1999 | Mordini et al. ............... | 426/597 |
| 6,174,542 | B1 * | 1/2001 | Hinton et al. ................. | 424/439 |
| 2004/0013656 | A1 * | 1/2004 | Matsubara et al. ........ | 424/93.45 |
| 2004/0213886 | A1 * | 10/2004 | Toves ............................ | 426/629 |
| 2006/0159818 | A1 * | 7/2006 | Kunieda ........................ | 426/534 |
| 2006/0165820 | A1 * | 7/2006 | Yatcilla et al. ................ | 424/729 |
| 2008/0031980 | A1 * | 2/2008 | Rodriguez et al. ............ | 424/773 |

OTHER PUBLICATIONS

Nair et al. "Fermented Soy" 2002, Well Being Journal vol. 11, No. 6.*
Chattopadhyay et al. 2004 "Turmeric and curcumin: Biological Actions and medicinal applications" Current Science vol. 87, No. 1.*
Bioperine Nutritional Supplement Review 2005 (http://web.archive.org/web/20050219123833/http://www.nutros.com/nsr-02058.html.*
Kelloff et al. 2000 "Progress in Cancer Chemoprevention:.." J Nutrition 130: 467S-471S.*
Giuseppe Garcea et al. "Consumption of the Putative Chemopreventive Agent Curcumin by Cancer Patients: Assessment of Curcumin Levels in the Colorectum and their Pharmocodynamic Consequences" Jan. 2005 Cancer Epidemiology Biomarkers Prey; 14(1) pp. 120-125.*

* cited by examiner

*Primary Examiner* — Humera Sheikh
*Assistant Examiner* — Felicia King (57) ABSTRACT

Disclosed are dietary nutritional supplements providing health benefits. Supplements provide various formulations of fermented soybean in combinations with sweetener(s), curcumin, and various other herbs and spices. Compositions are preferably in liquid or solid forms. In preferred embodiments of the invention, supplements have HAELAN 951® or dehydrated fermented soy made from HAELAN 951®, Curcumin C3 Complex®, sucralose, stevia, soy lecithin, barley malt, natural chocolate flavor, cocoa, BIOPERINE®, *Piper longum*, ginger, cardamom long, and cinnamon.

3 Claims, 2 Drawing Sheets

DIETARY NUTRITIONAL SUPPLEMENTS FOR HEALTHCARE

BACKGROUND OF THE INVENTION

1. Field of the Invention

The present invention relates generally to compositions and their use as dietary nutritional supplements. More specifically, the present invention relates to nutritional dietary formulations of fermented soybean product in combination with selected herbs and spices.

2. Description of the Prior Art

By way of background, the literature is replete with references to health benefits of herbs, spices, and natural food products. Approximately 75% of FDA approved drugs from 1981-2002 were either natural products, were based on natural products, or mimicked them in one form or another. Approximately 25% of the drug prescriptions in the United States are compounds derived from plants that were discovered through scientific investigation of folklore claims (Reynold, T. J., Natl. Cancer Inst. 183: 594-596, 1991). A significant percentage of our current pharmaceuticals were obtained from isolation of natural products involved in longstanding traditional or folklore remedies.

Soy. In the treatment of cancer and other diseases, patients frequently exhibit symptoms that interfere with their recovery even when there is clinical remission of disease. For example, malnutrition, anexoria, and cachexia are common problems with cancer patients. Cachexia occurs in more than 80% of patients who have advanced cancer with symptoms of loss of appetite, chronic nausea, fatigue, and changes in body weight, lean body mass, and total body fat (Bruera E 1998). Anorexia is associated with prolonged hospital stay and length of stay for rehabilitation. (Guo Y 2005). There are few effective treatments for the problem of cancer-associated cachexia. New treatment regimes to treat anorexia and cachexia in patients with advanced cancer are urgently needed. Soy isoflavones its metabolites have been shown in clinical, laboratory and epidemiological studies to be effective nutritional adjuvants for patients diagnosed with cancers.

Whole soybeans contain about 40% protein and are naturally high in isoflavones (including genistein, daidzein and their metabolites), phytosterols, saponins, protease inhibitors, phytic acid compounds, and the branched-chain fatty acid 13-methyl-tetradecanoic acid, that have been associated with positive nutritional effects, including reduction of blood serum cholesterol levels among other health benefits. The active agent MDT-13 (13-methyl-tetradecanoic acid) has been shown to induce apoptosis in tumor cell (Yang, Z., et al., 2000).

Fermented soy products are known to offer a broader nutrient profile than non-fermented soy foods such as soy milk soy nuts, tofu, and fresh or dry soybeans. The fermentation process increases the bioavailability of the constituents in soy by removing trypsin inhibitors found on the coating of soy that interfere with the absorption of nutritive compounds. The benefits of fermented soy include reducing risks of certain types of cancers, promoting heart and bone health, and alleviating menopausal symptoms. Fermented soy methods and products are described in U.S. Pat. Nos. 4,877,739 and 7,070,965.

Herbs and Spices. Although spices are generally added to food to improve taste, besides adding to taste they have a variety of functions that include providing antimicrobial activity, antioxidant functions, and a wide range of medicinal benefits. For example, in traditional folk medicine various herbs and spices have been used to treat digestive problems, including aiding digestion; relieving intestinal gas, constipation, diarrhea, dysentery; and even eliminating worms from the intestinal tract. While some medical claims for the efficacy of natural products have undoubtedly been exaggerated and others have proven false, many important medical claims have been confirmed and others are currently being investigated.

The variety of active compounds found in herbs and spices (i.e., phthallides, polyacetylenes, phenolic acids, flavonoids, coumarins, capsicinoids, triterpenoids, sterols, monoterpenes, alkaloids, etc) likely account for their activity. For example, antibacterial activity from dietary spices and medicinal herbs has been closely associated with their phenolic constitutents [Shan, B., et al., International J. Food Microbiol, 117(1):112-119 (2007)], Herbs and spices linked to digestive and other health benefits include, caraway and mustard seeds, juniper berries, spearmint, cinnamon, mace, pepper, ginger, coriander, fennel, cumin, nutmeg, sage, chocolate, garlic, dill, hyssop, oregano, rosemary, bee balm, lemon balm, sage, savory, thyme, parsley, bilberry, St. John's Wort, milk thistle, green tea, purslane, grape seed, cardamon, ginko, King Solomon's Seal, clove, stevioside, peppermint, licorice, sassafras, and turmeric. Cinnamon, for example, predominantly grown in India, China and Sri Lanka, might provide a natural remedy against adult onset type II diabetes, lowering "bad" LDL cholesterol, anti-blood clotting action, boosting brain function and alertness, treating colds and flu, and acting as a mild stimulant [Hunter, B., Consumers Res. Mag., 85(10):8-8 (2002); Grey, L. W., Better Nutrition, 69:18 (2007)]. Curcumin, the ingredient of turmeric that provides its yellow color, has shown promise treating Alzheimer's disease, cancer (i.e., ongoing research at M.D. Anderson Cancer Center in Houston, Tex.), and cystic fibrosis [Consumer Reports, 71(1):49 (2006]. Ginger has a long history of medicinal use dating back over 2500 years is reported to help with motion sickness, loss of appetite, nausea, and to have anticancer properties attributed to certain vanilloids as well as other constituents like shogaols and zingerone [Shukla, Y., et al., Food Chem. Toxicol, 45:(5):683-690 (2007)]. Raw ginger is reported to have hypoglycaemic, hypocholesterolaemic and hypolipidaemic potential and may be of great value in managing diabetic complications [Al-Amin, Z. M., et al., Br. J. Nutr., 96(4):660-666 (2006)]. [6]-Gingerol, a naturally occurring plant phenol that is one of the main components of fresh ginger, has a variety of pharmacological effects, including anti-oxidant, and anti-inflammatory activities (i.e., transactivation of CoX-2), and may be an effective therapeutic agent providing protection against UVB-induced skin disorders [Kim, J. K., et al., Free Radic. Res., 41(5):603-614 (2007)]. Peppermint is believed to help with loss of appetite, colds, coughs/bronchitis, sinusitis, fever, nausea and vomiting, indigestion and other digestive problems. Cardamom is reported to have antibacterial activity, including cavity-causing bacteria and bacteria that cause dandruff and acne. Stevioside, a natural plant glycoside isolated from the plant *Stevia rebaudiana*, has been used as a sweetener in Japan for more than 20 years and has been reported to have antihypertensive effects [Chan, P., et al., Clin. Pharmacol., 50:215-220 (2000)]. Herbs are reported to be potentially important resources for drug candidates against the onset of Alzheimer's disease [Kim, D. S., et al., J. Altern. Complement. Med., 13(3):333-340 (2007)].

There is currently a demand for low-carbohydrate, low-sugar food products. Stevia (also called sweetleaf, sweet leaf or sugarleaf) is a genus of about 150 species of herbal shrubs in the sunflower family (Asteraceae), native to subtropical and tropical South America and Central America. As a natural sweetener, stevia has a slower onset but longer taste duration than sugar (sucrose), although some of its extracts may have a bitter or liquorice-like aftertaste at high concentrations. With its extracts having up to 300 times the sweetness of sugar, stevia has shown promise as a natural sweetener especially for diabetics and others on carbohydrate-controlled diets.

Antioxidants. Among other chemical ingredients, many of the several thousand known herbs and spices have significant levels of antioxidants. The antioxidant properties of herbs and spices and their presumptive health and anti-aging effects, has led to the development and commercialization of a variety of nutritional herbal supplements, including pill forms. Although the best way to get antioxidants and other beneficial food ingredients may well be through a diversified balanced diet, this is not often the case and there is strong contemporary need for convenient health foods providing nutritional benefits. The known antioxidant activity of dietary spices (clove, cinnamon, pepper, ginger, garlic, mint, onion, etc) is one reason to suggest that, in addition to providing flavor to foods, they possess potential health benefits Pepper. Black pepper spice is obtained from peppercorns from fruits of *Piper nigrum* and is used widely throughout the world. Black pepper has been traditionally used in the Indian system of medicine 'Ayurveda' for the treatment of many ailments. Piperine (1-peperoylpiperidine), the alkaloid that is the active ingredient of black pepper, has various properties and uses, including flavoring, insecticide activity, antidiarrhoeal activity, anti-inflammatory activity, ability to enhance the bioavailability of drugs, ability to stimulate the release of epinephrine, ability to elevate levels of circulating thyroid hormones, antioxidant functions (i.e., ability to reduce high-fat diet induced oxidative stress to cells); and analgesic, antibacterial and antiseptic properties [Vijayakumar, R. S., et al., Redox Report, 9(2)⊛2004; Reddy, P. S., et al., 39(3): 236-238 (2001)].

Dried long pepper is obtained from *Piper longum*. Long pepper is of South Asian origin and has a pungent and simultaneously sweet taste. It is more pungent than black pepper. In India, a major use for long pepper is in spicy vegetable pickles. Since terpene components are missing in the aroma of long pepper, it cannot be conveniently substituted for ordinary black pepper.

Curcumin. The Indian spice Tumeric, derived from the rhizome of the plant *Curcuma longa*, is a gold-colored spice traditionally used in the Indian Subcontinent for health care, the preservation of food, and as a yellow dye for textiles. Curcumin (diferuloylmethane) is the ingredient of tumeric that gives this spice its yellow color. Many therapeutic functions have been attributed to tumeric, including treatment of a wide variety of diseases and conditions of the skin, pulmonary system, gastrointestinal system, aches, pains, wound, sprains, and liver disorders. Research in recent years indicated that most of these benefits of tumeric are due to cucumin. Cucumin has been shown to exhibit antioxidant, anti-inflammatory, antiviral, antibacterial, antifungal, and anticancer activities, and has potential use against various malignant diseases, diabetes, allergies, arthritis, Alzheimer's disease, and other chronic illnesses. Tumeric has been used for centuries by people of the Indian subcontinent as a component of food and as a treatment for a wide variety of ailments without any known side effects. Tumeric is called curry powder in the West. Indian and Chinese traditional medicine uses this spice as an anti-inflammatory agent to treat gas, colic, toothaches, chest pains, and menstrual problems, to help with stomach and liver problems, to heal wounds and lighten scars. Tumeric has also been used as a cosmetic. Tumeric contains various phytochemicals, including curcumin, demethoxycurcumin, bisdemethoxycurcumin, zingiberene, curcumenol, curcumol, eugenol, etrahydrocurcumin, triethylcurcumin, turmerin, turmerones, and tumeronols (Aggarwal et al, 2006).

Given the foregoing, it will be appreciated that new nutritional formulations of natural plant products are desirable to provide dietary health benefits. The present invention is directed toward this goal.

Accordingly, it is an object of the present invention to provide new and improved formulations of plant products that provide nutritional health benefits.

Another object of the present invention is to provide liquid and solid dietary nutritional supplements that contain fermented soybean, curcumin and additional herbs and spices.

Yet another object of the present invention is to provide dietary nutritional supplements that provide combinations of plant products in various forms that are convenient for human consumption.

These and other objects and advantages of the present invention and equivalents thereof, are achieved by the methods and compositions of the present invention described herein and manifest in the appended claims.

SUMMARY OF THE INVENTION

The present invention provides in one embodiment a dietary supplement composition in powder form that is a mixture of fermented soy and curcumin, in amounts provide nutritional benefits. In this powder supplement, the fermented soy is in an amount from about 80 wt % to about 99.5 wt % and the curcumin is in an amount from about 0.5 wt % to about 20 wt % based on the total weight of the composition. Preferably, cucurmin is Curcumin C3 Complex® and the fermented soy powder is preferably obtained from dehydration of liquid HAELAN 951® product (Stenotrophomonas fermentation product) or comparable or equivalent thereof. The base dietary supplement powder of fermented soy and curcumin may further contain at least one sweetener ingredient selected from the group of: cyclamate, saccharine, aspartame, sulfame potassium, sucralose, sugar alcohols, stevioside, stevia, sucrose, glucose, maltose and honey in an amount effective to provide a pleasant taste to the composition. The sweetener, or mixture of sweeteners, is preferably from about 0.5 wt % to about 2.0 wt % based on the total weight of the composition. Preferred sweeteners are sucralose and stevia used individually or in combination.

In addition to a fermented soy and curcumin base, the powder dietary composition may also contain at least one other ingredient (plant, plant part, or any extract thereof) selected from the group of: turmeric (*Curcuma longa*), cumin (*Cuminum cyminum*), black pepper (*Piper nigrum*), long pepper (Piper longum), BIOPERINE®, cinnamon (*Cinnamonum zeylanicum*), coriander (*Coriandrum sativum*), red pepper (*Capsicum frutescens*), clove (*Syzygium aromaticum*), ginger (*Zingiber ofticinale*), tejpat (*Cinnamon tamala*), fennel (*Foeniculum vulgare*), Kaala Jeera (black cumin), cardamom (*Amomum subulatum*), cardamon long, kalonji (*Nigella sativa*), ajowan (*Trachyspermum ammi*), mint (*Mentha piperta*), sesame seeds (*Sesamum indicum*), asafetida (*Ferula narthex*), curry leaves (*Murraya koenigii*), pomergrate (*Punica granatum*), nutmeg (*Myristica fragrans*), saffron (*Corcus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvi*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vitis vinifera*), pecans (*Carya illinoensis*), figs (*Ficus carica*), fenugreek (*Trigonella foneum-gracium*), fenugreek seeds, flax (*linum usitatissimum*), til (*Sesamum indicum*), tulsi (*Ocimum basilicum*), lemon grass (*Cymbogogon flexusosus*), ginseng, green tea, lutein, ashwaghanda, caraway seed, juniper berries, spearmint, mace, fennel, nutmeg, sage, hyssop, bee balm, lemon balm, sage, savory, thyme, bilberry, St. John's Wort, milk thistle, tea, green tea, purslane, grape seed, ginko, King Solomon's Seal, peppermint, sassafras, cocoa, chocolate powder, lipids, lecithin, soy lecithin, carbohydrates (sugars, starches, etc.), grains and malts, and barley malt. Preferred other ingredients are BIOPERINE®, *Piper longum*, ginger, cardamon long, cinnamon, soy lecithin, barley malt, natural chocolate flavor and cocoa. The other ingredient(s) is/are preferably from about 0.1 wt % to about 20 wt % based on the total weight of the composition.

The fermented soy and curcumin powder base supplement composition may also contain; (1) at least one sweetener ingredient selected from the group of cyclamate, saccharine, aspartame, sulfame potassium, sucralose, sugar alcohols, stevioside, stevia, sucrose, glucose, maltose and honey in an amount from about 0.5 wt % to about 2.0 wt % based on the total weight of the composition; and (2) at least one other ingredient selected from: turmeric (*Curcuma longa*), cumin (*Cuminum cyminum*), black pepper (*Piper nigrum*), long pepper (*Piper longum*), BIOPERINE®, cinnamon (*Cinnamonum zeylanicum*), coriander (*Coriandrum sativum*), red pepper (*Capsicum frutescens*), clove (*Syzygium aromaticum*), ginger (*Zingiber officinale*), tejpat (*Cinnamon tamala*), fennel (*Foeniculum vulgare*), Kaala Jeera (black cumin), cardamom (*Amomum subulatum*), cardamom long, kalonji (*Nigella sativa*), ajowan (*Trachyspermum ammi*), mint (*Mentha piperta*), sesame seeds (*Sesamum indicum*), asafetida (*Ferula narthex*), curry leaves (*Murraya koenigii*), pomergrate (*Punica granatum*), nutmeg (*Myristica fragrans*), saffron (*Corcus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvi*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vitis vinifera*), pecans (*Carya illinoensis*), figs (*Ficus carica*), fenugreek (*Trigonella foneum-gracium*), fenugreek seeds, flax (*linum usitatissimum*), til (*Sesamum indicum*), tulsi (*Ocimum basilicum*), lemon grass (*Cymbogogon flexusosus*), ginseng, green tea, lutein, ashwaghanda, caraway seed, juniper berries, spearmint, mace, fennel, nutmeg, sage, hyssop, bee balm, lemon balm, sage, savory, thyme, bilberry, St. John's Wort, milk thistle, tea, green tea, purslane, grape seed, ginko, King Solomon's Seal, peppermint, sassafras, cocoa, chocolate, lipids, lecithin, soy lecithin, carbohydrates (sugars, starches, etc.), grains, grain malts, and barley malt, in an amount from about 0.1 wt % to about 20 wt %, based on the total weight of the composition. Preferred other ingredients are BIOPERINE®, *Piper longum*, ginger, cardamon long, cinnamon, soy lecithin, barley malt, natural chocolate flavor and cocoa.

In the powder dietary supplement of fermented soy, cucumin, sweetener and other ingredient, the preferred fermented soy ingredient is fermented soy powder obtained from HAELAN 951®; the preferred curcumin is Curcumin C3 Complex®; the preferred at least one sweetener ingredient is a mixture of stevia and sucralose; and the preferred at least one additional ingredient is a mixture of BIOPERINE®, *Piper longum*, ginger, cardamom long, cinnamon, barley malt, soy lecithin, cocoa, and chocolate.

The present invention also provides a dietary supplement containing (i) fermented soy; (ii) curcumin; (iii) at least one sweetener ingredient selected from the group of cyclamate, saccharine, aspartame, sulfame potassium, sucralose, sugar alcohols, stevioside, stevia, sucrose, glucose, maltose and honey; (iv) at least one additional plant ingredient, plant part, or any extract thereof, selected from the group of: turmeric (*Curcuma longa*), cumin (*Cuminum cyminum*), black pepper (*Piper nigrum*), long pepper (*Piper longum*), BIOPERINE®, cinnamon (*Cinnamonum zeylanicum*), coriander (*Coriandrum sativum*), red pepper (*Capsicum frutescens*), clove (*Syzygium aromaticum*), ginger (*Zingiber officinale*), tejpat (*Cinnamon tamala*), fennel (*Foeniculum vulgare*), Kaala Jeera (black cumin), cardamom (*Amomum subulatum*), cordamon long, kalonji (*Nigella sativa*), ajowan (*Trachyspermum ammi*), mint (*Mentha piperta*), sesame seeds (*Sesamum indicum*), asafetida (*Ferula narthex*), curry leaves (*Murraya koenigii*), pomergrate (*Punica granatum*), nutmeg (*Myristica fragrans*), saffron (*Corcus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvi*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vitis vinifera*), pecans (*Carya illinoensis*), figs (*Ficus carica*), fenugreek (*Trigonella foneum-gracium*), fenugreek seeds, flax (*linum usitatissimum*), til (*Sesamum indicum*), tulsi (*Ocimum basilicum*), lemon grass (*Cymbogogon flexusosus*), ginseng, green tea, lutein, ashwaghanda, caraway seed, juniper berries, spearmint, mace, fennel, nutmeg, sage, hyssop, bee balm, lemon balm, sage, savory, thyme, bilberry, St. John's Wort, milk thistle, tea, green tea, purslane, grape seed, ginko, King Solomon's Seal, peppermint, sassafras cocoa, chocolate, lipids, lecithin, soy lecithin, carbohydrates (sugars, starches, etc.), grains, and grain malts (ie., barley malt); and (v) a pharmaceutically or cosmetically acceptable carrier. Preferred other ingredients are BIOPERINE®, *Piper longum*, ginger, cardamom long, cinnamon, soy lecithin, barley malt, natural chocolate flavor and cocoa. The pharmaceutically or cosmetically acceptable carrier is conveniently selected from the group of water, aqueous systems, tea, green tea, coffee, fruit juices, glycerin, alcohols, fatty alcohols, fatty ethers, fatty esters, polyols, glycols, vegetable oils, mineral oils, cultured dairy products, dairy products, carbonated or uncarbonated beverages.

In the supplement of the invention with fermented soy, curcumin, at least one sweetener, and at least one additional ingredient, the fermented soy is in an amount from about 0.5 wt % to about 90 wt %, the curcumin is in an amount from about 0.5 wt % to about 20 wt %, the sweetener ingredient is in an amount from about 0.1 wt % to about 2.0 wt %, the at least one additional ingredient (plant, plant part, or extract thereof) is in an amount from about 0.1 wt % to about 20 wt %, and the carrier is in an amount from about 0.5 wt % to about 90 wt % based on the total weight of the composition. This supplement may be in a product form selected form the group of liquid, aerosol spray, cream, emulsion, solid, dispersion, foam, gel, lotion, ointment, powder, solution, tablets, bakery items, and capsules. The preferred fermented soy ingredient is HAELAN 951° or powder form fermented soy obtained from HAELAN 951® in an amount from about 0.5 wt % to about 90 wt %; the preferred curcumin is Curcumin C3 Complex® in an amount from about 0.5 wt % to about 20 wt %; the preferred at least one sweetener ingredient is and mixture of stevia and sucralose in an amount from about 0.1 wt % to about 2.0 wt %; the preferred at least one additional ingredient is an admixture of BIOPERINE®, *Piper longum*, ginger, cardamom long, cocoa, chocolate, barley malt and cinnamon in an amount from about 0.1 wt % to about 20 wt; and said preferred carrier is water in an amount from about 0.5 wt % to about 90 wt %, based on the total weight of the composition.

The powder form fermented soy of claim used in the formulations of the invention is obtained from liquid fermented soy by the method of heating liquid fermented soy under vacuum to remove water and producing a concentrated fermented soy composition; vaporizing the concentrated fermented soy composition under pressure; and exposing said vaporized soy composition to hot air thus further removing remaining water from the soy composition and producing said power form fermented soy. The preferred liquid fermented soy is HAELAN 951® or equivalent thereof.

DETAILED DESCRIPTION OF THE INVENTION

The present invention provides dietary nutritional formulations for healthcare. The compositions of the invention comprise fermented soy and curcumin and optionally selections of various herbs, spices, and natural or processed ingredients.

Figure 1:
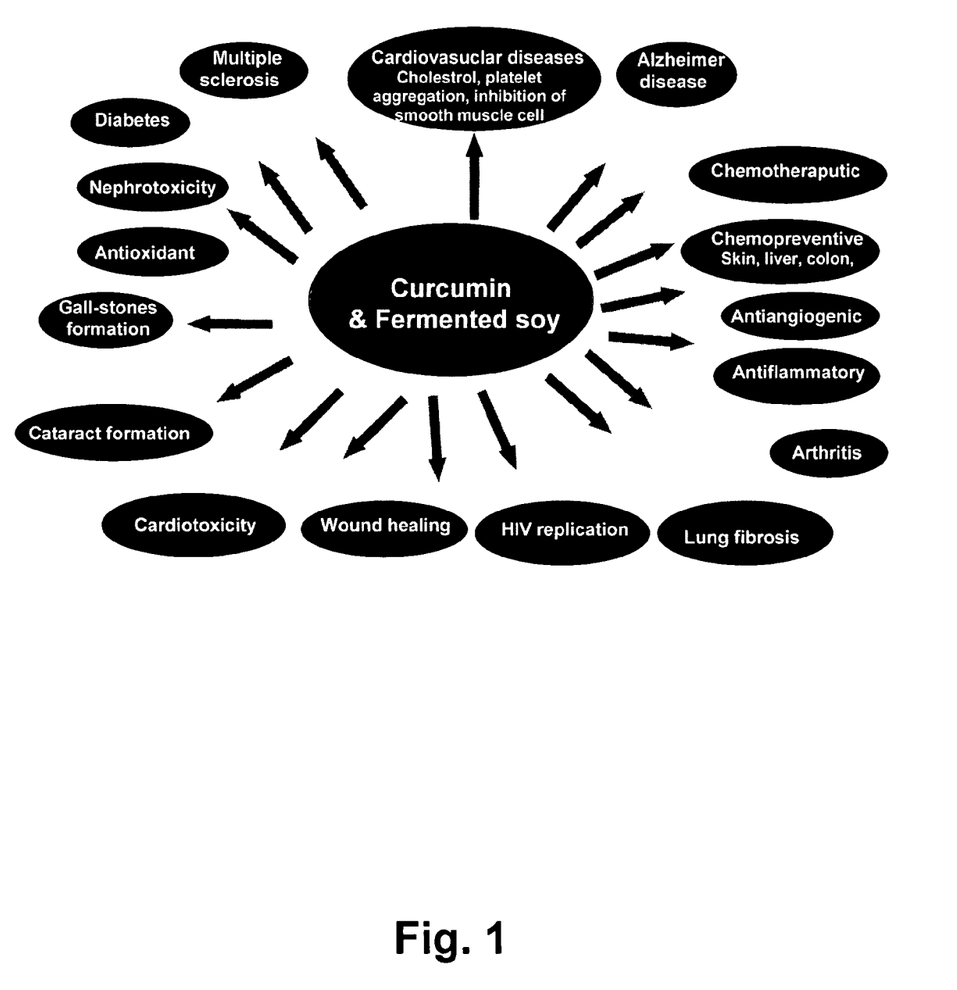
FIG. 1 is a schematic diagram of the therapeutic potential of curcumin and fermented soy.

Referring now to FIG. 1, illustrated are some of the potential therapeutic applications of curcumin and fermented soy including, but not necessarily limited to, diabetes, multiple sclerosis, cardiovascular diseases (cholesterol, platelet aggregation, inhibition of smooth muscle cell), Alzheimer's Disease, chemotherapeutics, chemoprevention (skin, liver, colon), antiangiogenics, antiinflammatory, arthritis, lung fibrosis, HIV replication, wound healing, cardiotoxicity, cataract formation, gall-stone formation, antioxidants, and nephrotoxicity.

Figure 2:
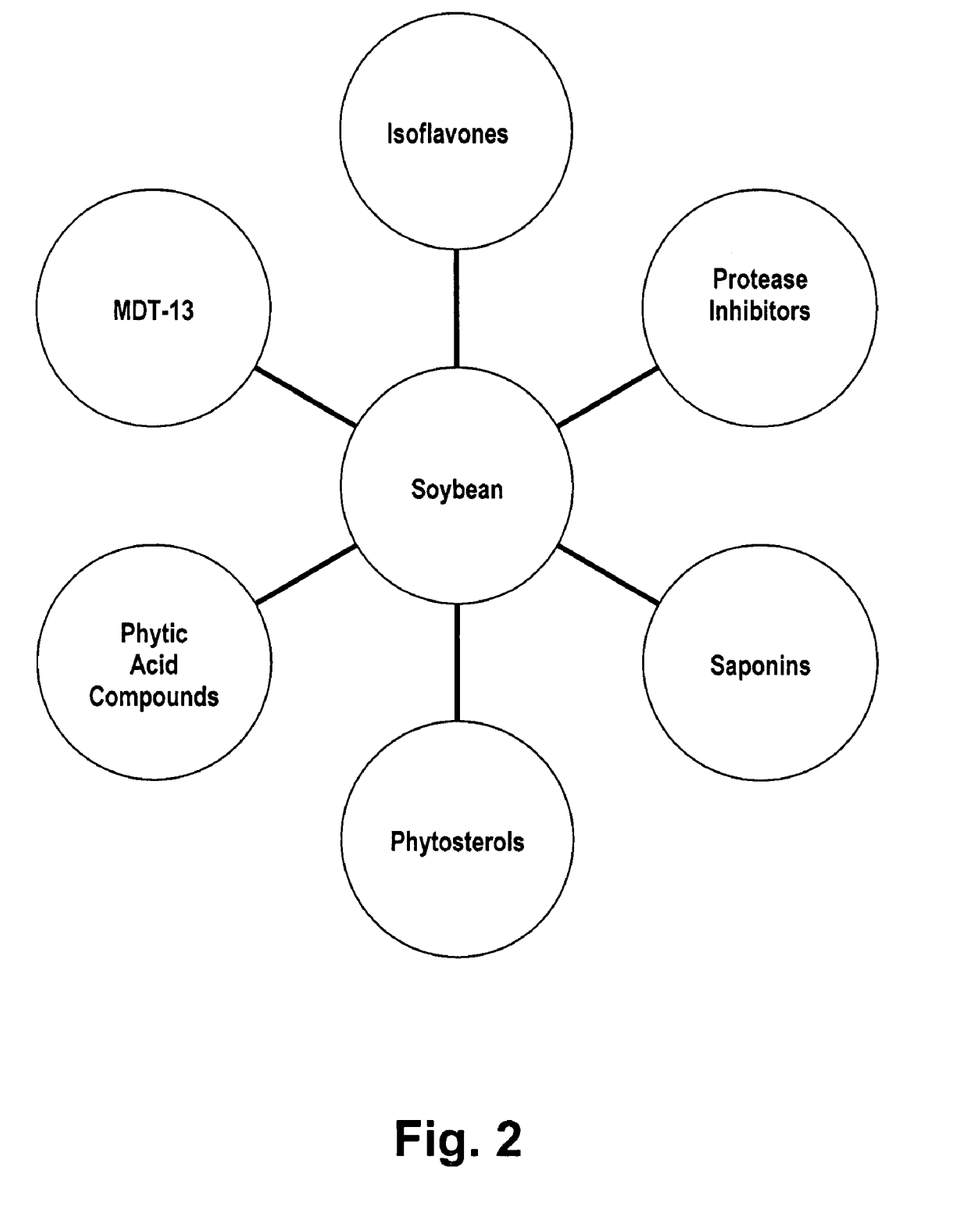
FIG. 2 is a schematic diagram of the ingredients of whole soybean.

Referring now to FIG. 2, illustrated are the ingredients of whole soybean including Isoflavones (including genistein, daidzein and their metabolites), protease inhibitors, saponins, phytosterols, phytic acid compounds, and the saturated branched-chain fatty acid MD-13 [13-methyl-tetradecanoic acid]. The active agent MDT-13 has been shown to induce apoptosis in tumor Cells (Yang, Z, et al., 2000). Research has shown that the nuclear factor kappaB (NF-KB) family of transcription factors are involved in multiple cellular processes, including cytokine gene expression, cellular adhesion, cell cycle activation, apoptosis and oncogenesis. Nuclear factor (NF)-κB has been shown to regulate proliferation, invasion, and metastasis of tumor cells. In animal models, suppression of NF-KB has shown decrease of cancer associated cachexia. Soy isoflavone, especially genistein has been shown in animal studies to promote apoptosis by decreasing NF-κB activity.

Fermentation is the oldest known form of food biotechnology, and records of barley conversion to beer date back more than 5000 years. The traditional fermentation process serves several functions, including the enrichment of food substrates biologically with protein, essential amino acids, essential fatty acids, vitamins, polyamines, carbohydrates, and numerous anti-oxidants and phytosterols. The fermentation process, for example, with lactobacilli, increases the quantity, availability, digestibility, and assimilation of nutrients in the body.

We hypothesize that certain naturally fermented soy food beverages (i.e., HAELAN 951®) will improve the cachexia, anorexia, and fatigue symptoms as well as enhance the nutritional status of patients or individuals with various diseases or conditions (i.e., advanced cancer, AIDS, geriatric patients, malnutrition, etc.). Fermentation process is known to improve nutrient availability from soy. This fermented soy beverage has also been shown to has been known to contain 12, 13 methyltetradecanoic acid. Researchers at MD Anderson Cancer Center and other research centers have found that that targeted arterial delivery of branched chain fatty acids such as 12-MTA may be considered as a potential new therapy for treatment of solid tumors. The exact mechanism(s) responsible for the observed inhibition of tumor growth in animal models by 12-MTA is unclear. Additional in vivo studies are warranted to elucidate 12-MTA's mechanism of action and further investigate the branched chain fatty acid's antitumor effects.

There are three fermented soy beverages that are or have been sold in the US market namely, EcoNugenics®, Soy Unique™, and HAELAN™. Of these three products, a market report analysis done by Iowa State University in May 2000 showed that the soy isoflavones, daidzin, genistin, and as well as the fermented isofloavone metabolites were significantly higher in the HAELAN 951® samples as compared to the other two products. HAELAN 951® is a preferred fermented soy product for preparation of the concentrated soy protein powder used in formulations of the present invention. The dietary nutraceutical HAELAN 951®, a fermented soy supplement, is made by HAELAN 951® Products Inc. based in Seattle, Wash., USA. HAELAN 951® is a cultured soybean product manufactured by bacterial fermentation as described in U.S. Pat. No. 7,070,965.

The manufacture of HAELAN 951® hydrolyzes many of the soybean proteins into amino acids and compounds that are rich in nitrogen, polysaccharides, and fermentation metabolites of the naturally occurring isoflavones, protease inhibitors, saponins, phytosterols, and inositol hexaphosphate compounds in soybeans. The manufacturing process (fermentation) of HAELAN 951® uses the bacterium *Stenotrophomonas maltophilia* Q-can. This soy beverage is a concentrated nutritional supplement that is rich in soybean proteins, selenium, zinc, beta-carotene (Vitamin A), riboflavin (Vitamin B1), thiamine (Vitamin B2), cyanocobalamin (Vitamin B12), ascorbate (Vitamin C), cholecalciferol (Vitamin D3), alpha tocopherol (Vitamin E), and phylloquinone (Vitamin K1). It also contains additional micronutrients such as daidzein, genistein, protease inhibitors, saponins, phytosterols, inositol hexaphosphate, essential fatty acids such as linolenic and linolic acids, polysaccharides peptide, and twenty-two amino acids including ornithine. It takes over 25 pounds of soybeans to make one concentrated eight-ounce-bottle of HAELAN 951® beverage. Of these naturally occurring nutritional items in the HAELAN 951® formula, more than twenty of them are known individually for their ability to enhance the nutritional profiles of individuals with cancers. The fermentation process breaks down the complex proteins of soybeans making them more easily digested that the proteins of whole soybeans. Soy fermentation also serves to activate soy isoflavones. Fermented soy products contain more unconjugated isoflavones than non-fermented soy products due to microbial action during fermentation.

Experimental results with HAELAN 951® show that this composition stimulates & accelerates the hematopoiesis of infant mice; lowers oxidative stress reactions (i.e., reduction of hepatic and cerebral lipoperioxide concentrations); provides immunological benefits (i.e., enhances cellular immunity); evidence suggests that it may protect against acute hepatic damage; and may provide anti-mutating benefits in cancer by resisting base substitution or other mechanism.

*Stenotrophomonas maltophilia*, used to ferment soy producing HAELAN 951®, contains a high percentage of branched-chain fatty acids (c.f., U.S. Pat. No. 7,070,965). Other bacterial genera containing high percentage branched-chain fatty acids are: *Xanthomonas, Flavobacterium, Capnocytophga, Altermonas, Cytophage, Bacillus, Chryseobacterium, Empdobacter, Aurebacterium Sphinggobaacterium, Staphylococcus, Azobacter* and *Pseudomonas*. These bacteria, and others that may contain a high percentage of branched chain fatty acids, are microorganisms that may be considered for fermentation of soybeans for use in the preparation of compositions if the present invention. For example, *Azotobacter vinelandii* is a diazotroph described in U.S. Pat. No. 4,877,739 that can fix nitrogen while grown aerobically. It is a genetically tractable system that is used to study nitrogen fixation. These bacteria are easily cultured and grown. It is a free-living N2 fixer which is known to produce many phytohormones and vitamins in the soil (Order Pseudomonadles).

It is being increasingly recognized that soy and soy protein isolates have potentially anti-nutritive value due to their high phyate and oxalic acid levels. Cultured soy products such as miso, natto, and tempeh have enhanced nutritive bioavailability without the possible ill effects of the uncultured soy supplements. Uncultured soy with its high phyate levels has been shown in a number of studies to block absorption of vital nutrients such as calcium. The use of soy as a culturing medium is advantageous because iron is naturally available in soy. Iron in an elemental form is potentially toxic and pro-oxidative, but a lack of iron in the body potentiates development of anemia and can thus be lethal. Cultured soy has been shown to enhance the bioavailability of iron and copper, and hence rendering the deliver of these nutrients in their most advantageous forms.

The World Health Organization reported in 2000 that the Japanese with their extensive consumption of cultured soy products, such as miso and natto, together with accompanying food like ginger, ocean herbs, and green tea, have the longest and "healthiest life expectancy" of any other people on Earth. Americans, on the other hand, do not even appear on the top 20 of the list for healthy life expectancy. The Western diet has undue emphasis on the consumption of "smart" products that are processed or genetically modified. Unfortunately, the abandonment by consumers in developing countries of their more traditional fermented foods in exchange for the "sophisticated" Western dietary products could have serious consequences. For example, the replacement of indigenous fermented cereal drinks with cola beverages that have empty calories could have a serious impact on the daily nutrition of many of these consumers in developing countries when the extensive medical benefits of consuming the traditional sources of probiotic whole-food nutrition is lost.

Soy has been a staple of the Southeast Asia diet for nearly five thousand years. Both its medicinal and nutritional values are deeply rooted in Traditional Chinese Medicine and herbalism. On the other hand, consumption of soy in the United States and Western Europe has been limited to the $20^{th}$ century. Asians on the average eat twenty to fifty times more soy than Americans.

Typically soy foods are divided into two categories: non-fermented and fermented soy products. Traditional non-fermented soy foods include fresh green soybeans, whole dry soybeans, soy nuts, soy sprouts, whole-fat soy flour, soymilk, and soymilk products such as tofu, okara, and yuba. Traditional fermented soy foods include tempeh, miso, soy sauces, natto, and fermented tofu and soymilk products. In Asia, the traditional fermented soy foods are considered to have more health promoting benefits when consumed in moderate amounts than the super-processed soy products that are consumed in the West. It has been suggested that the fermentation process increases availability of isoflavones in soy. For example, a study of the culturing method involved in the production of the Japanese traditional food, miso, came to the conclusion that the culturing process itself led to a "lower number of cancers per animal" and a "lower growth rate of cancer compared to controls". The researchers also indicated that it was not the presence of any specific nutrient that was cultured along with the soybean paste, but rather the cultured soy mediums itself that was responsible for the health benefits associated with miso consumption. Miso, a fermented or probiotic form of soybean, is particularly rich in the isoflavone aglycones, genistein, and daidzein, which are believed to be cancer chemopreventives. The fermentation process is thought to covert the isoflavone precursors genistin and daidzin to their active anti-cancer isoflavone forms, genistein, and daidzein. It is unfortunate that in the Untied States, health-conscious consumers, especially women concerned about developing breast cancer, are urged by media and consumer reports to consume soy or soy protein isolates which are not the forms that soy is traditionally consumed in Japan. The overwhelming majority of soy consumed in Asian countries such as Japan, China, Korea, and Indonesia is in its cultured or probiotic form enhanced with genistein and daidzein. Japanese researchers found that the cultured broth of Saccharomyces cerevisiae or Brewer's Yeast, produced both in vivo and in vitro experiments, bio-antimutagenic and anticlastogenic activity with mutagen formation reduced by 47% just by the administration of the cultured broth. The cultured soy medium had thus produced its own unique anti-carcinogenic activity by strongly inhibiting formation of cellular mutations.

A recent Korean study conclude that tofu was one of the foods that decreased the rates of certain cancers such as stomach cancer, while heavy salt consumption and cooking methods increased the rates. The limited epidemiological evidence so far from cultures with diets that are high in fermented soy products indicates that such diets may reduce risk of breast, colon, lung, and stomach cancers, as well as offer some protection from cardiovascular diseases, osteoporosis, and menopause symptoms. But the clinical data to date is often flawed with poor design and other methodological issues, and the role of isoflavones in chemoprevention, especially in the hormonally dependent cancers such as breast and prostate cancers, is still lacking unequivocal evidence.

The controversy over the role of soy in preventing and treating chronic illnesses such as cancer was recently addressed at the $4^{th}$ International Symposium held in San Diego in November 2001. To date, there has been a paucity of literature regarding soy, particularly the use of fermented soy products in clinical trials. Part of the reason may be the costly technology required in processing and manufacturing of these fermented soy products and supplements for large-scale use. Studies have been done to determine if the phytoestrogens content of these products are affected by processing, or whether there are chemicals modifications of the isoflavonoids due to the conditions present during the processing. Traditional sources of fermented soy foods that are not prepared under the stringent standards lack that full benefits. Tempeh production, for example, requires a fermentation process utilizing whole soybeans, but there have been few clinical reports on the effects of its chemically modified isaflavonoids.

Some studies have suggested that the isoflavone genistein may have some role as a chemopreventive agent against cancer in human. Levels of genistein and its beta-glucoside conjugate, genistin, ingested in soybeans and related bean products by the Japanese were quantified by HPLC, to estimate daily intake of these compounds. A Japanese study found that the level of genistein in the fermented soybean products was higher than in soybeans and soybean products such as soymilk and tofu. This and other studies have postulated that the beta-glycosyl bond of genistin is cleaved to produce genistein by microbes during fermentation to yield miso and natto. Soy sauce was also found to contain both isoflavones, but at the levels of lower than in miso and natto. On the basis of these data for average annual consumption of soybeans and related products, daily intake of genistein and genistin by the Japanese was calculated to be 1.5-4.1 and 6.3-8.3 mg/person, respectively. These levels are much higher than those of Americans or Western Europeans, whose mortality rates for breast, colon, and prostate cancers are greater than the Japanese.

One underlying theoretical paradigm is that primary active ingredients in complex fermented soy "foods" act synergistically with secondary compounds. A second paradigm is that secondary compounds mitigate the undesirable side effects caused by the predominant active ingredients. Another possibility is that the multiple ingredients act through multiple discrete pathways to therapeutically affect the host, and that lower concentrations of each of the botanicals or soy phytochemicals can therefore be more efficacious when used together than when used individually. Studies are needed to demonstrate the mechanisms of action and to verify the efficacy. Studies can also compare complexes versus single agents. The benefits of using these complex fermented soy "foods" have historically been based on empirical observation. These concepts help determine which combinations are truly likely to be efficacious. The Chinese have recognized the health benefits of fermented soy food (i.e., *Douchil* salted black bean, soy sauce etc.).

We may never really understand precisely the mechanisms of how individual natural products, combinations of natural products, or various extracts of natural products help enhance our health and well being. Various food supplements, nutrient formulations, spice and herbal formulations and the like that have biologically active ingredients have a variety of possible biochemical, nutritional and therapeutic functions. There are multiple factors arising from the organic constituents of higher plants and microorganisms that play an important role including carbohydrates, water-soluble organic acids, aromatic compounds, lipids, volatile alcohols, carbonyl compounds, terpinoids, steroids, flavonoids & related compounds, amino acids & proteins, nucleic acids & derivatives, alkaloids, porphyrins, miscellaneouls nitrogen and sulfur compounds, bacteriocins, phenolics, phospholipids, beta-glucans, and glutathione, etc. The literature suggests several situations in which viability is not required for some activities. Improved digestion of lactose, for example, in yogurt, fermented soy, and other modulation and anti-hypertensive effects have been linked to nonviable cells such as cell components, enzymes activities, or fermentation products. It seems likely that the culturing in and of itself, apart from any vitamin or mineral enhancement, apart even from the presence of live active culture in the food, creates nutrients that are of extraordinary value in promoting health. The present invention provides fermented soy in combination with various natural products to provide health promotion compositions.

Preparation of Fermented Soybean Powder. The compositions of the invention have fermented soy as a base ingredient. The fermentation process increases the bioavailability of the constituents in soy in part by removing the trypsin inhibitors found on the coating of soy that interfere with the absorption of nutritive compounds. Accordingly fermented soy offers a broader nutrient profile than non-fermented soy foods such as soy milk, soy nuts, tofu, and fresh or dry soybeans. Preferred fermented soy ingredients are HAELAN 851® and HAELAN 951®, with HAELAN 951® especially preferred. HAELAN 951® is a third generation product. The Haelen products, using low heat processing and other methodology, have been developed and improved over the last fifteen years by researchers in the United States and China. HAELAN 851® and 951® products produce results that other soy products try to duplicate. However, with over 10,000 varieties of soybeans and the extensive possible blending combinations of the isoflavones, protease inhibitors, saponins, phytosterols, inositol hexaphosphate compounds, phytates, phytic acid, and other beneficial compounds (including macronutrients and micronutrients), the HAELAN™ products are preferred sources for preparation of the fermented soy powder ingredient of the formulations of the invention. With knowledge of the extensive variation (i.e., up to 50%) in the nutritional value of soybeans based on the particular selected species, the geographical area reflecting soil chemistry, the age of the soybeans, as well as processing (handling, preparation, & fermentation), the HAELAN™ products were developed. The HAELAN 951® fermented soy supplement has been sold as a food beverage in the United States for past 12 years. The HAELAN 951® product is conveniently dehydrated to produce a dry powder used in the preparation of compositions of the invention. It is desirable to dehydrate/dry the soy fermentation product at as low a temperature as possible in order to avoid possible temperature degradation or reaction of ingredients. A representative dehydration process is described in detail in Example 1 below. Although HAELAN 851® and 951® are preferred sources for the preparation of powder soy with HAELAN 951® especially preferred, alternatively, any comparable microbial fermented soy preparation may be used and conveniently dehydrated to a powder, especially *Stenotrophomonas* spp. fermented product. HAELAN 951® contains the following isoflavones: daidzin, glycithin, genistin, acety glycitin, daidzein, glycitein, acetyl genistin, and genistein. HAELAN™ Products, Inc., Woodinville, Wash., 98072, U.S.A., has commercialized HAELAN 951® and other similar products in the United States as nutritional products. However, various health claims are made for these products in foreign countries. Research indicates that the benefits attributed to such fermented soybean products are directly related to the soybean nutrients genistein, daidzein, protease inhibitors, saponins, phytosterols, phytic acid and other soybean compounds. The weight % of powdered fermented soy of the powder compositions of the invention, based on total weight of the composition, ranges in some formulations from about 0.5% to 99.9% (i.e., soy+curcumin) and preferably about 50% in other formulations (i.e., soy, curcumin & other ingredients).

Spices and Herbs. In the compositions of the invention, any combination of spices, herbs, and natural products may be conveniently added to fermented soy powder to provide pleasant taste, composition solubility, composition stability, and/or additional nutritional benefits. Spice ingredients include, but are not limited to, the following Indian spices that are Potential Sources of NF-kB blockers: tumeric (*Curcuma longa*), cumin (*Cuminum cyminum*), black pepper (*Piper nigrum*), cinnamon (*Cinnamonum zeylanicum*), coriander (*Coriandrum sativum*), red pepper (*Capsicum frutescens*), clove (*Syzygium aromaticum*), ginger (*Zingiber officinale*), tejpat (*Cinnamon tamala*), fennel (*Foeniculum vulgare*), Kaala Jeera (black cumin, cardamom (*Amomum subulatum*), kalonji (*Nigella sativa*), ajowan (*Trachyspermum ammi*), mint (*Mentha piperta*), sesame seeds (*Sesamum indicum*), asafetida (*Ferula narthex*), curry leaves (*Murraya koenigil*), pomergrate (*Punica granatum*), nutmeg (*Myristica fragrans*), saffron (*Corcus sativus*), dill (*Anethum graveolens*), oregano (*Origanum vulgare*), coriander (*Coriandrum sativum*), parsley (*Petroselinum crispum*), camphor (*Cinnamomum camphor*), licorice (*Glycyrrhiza glabra*), caraway (*Carum carvl*), mustard (*Brassica juncea*), tamarind (*Tamarindus indica*), rosemary (*Rosmarinus officinalis*), onion (*Allium fistulosum*), garlic (*Allium sativum*), almonds (*Amygdalus comunis*), cashews (*Anacardium occidentale*), walnut (*Juglans nigra*), mace (*Myristica fragrans*), mango (*Magnifera indica*), prunes (*Prunus domestica*), raisins (*Vitis vinifera*), pecans (*Carya illinoensis*), figs (*Ficus carica*), fenugreek (*Trigonella foneum-gracium*), fenugreek seeds, ashwaghanda, flax (*linum usitatissimum*), til (*Sesamum indicum*), tulsi (*Ocimum basilicum*), and lemon grass (*Cymbogogon flexusosus*). Extracts, plant materials (i.e., ginseng), teas (i.e., tea, green tea, herbal teas, etc.), purified natural ingredients of plant materials or synthetic equivalents (i.e., vanilla), inorganic salts, and sweeteners individually or in any combination may also be added to the fermented soy-based nutritional formulations of the invention. Sweeteners either artificial sweeteners (i.e., cyclamate, saccharine, aspartame, sulfame potassium, sucralose, sugar alcohols) or natural product sweeteners (stevioside, stevia, sucrose, glucose, maltose, honey, etc.) may be added. Cocoa and chocolate powders are preferred additives. Lipids (i.e., lecithin, soy lecithin) may be added (i.e., as emulsifiers), carbohydrates (sugars, starches, etc.), grains, and malts (ie., barley malt) may also be used as ingredients.

In powder form compositions of the invention, it is preferred to have: fermented soy; curcumin (Curcumin C3 Complex®), sucralose, and stevia, and optionally to add other spices and herbs for specific nutritional needs, tastes, or product formulation requirements. Based on the total weight of the composition, it is preferred that powdered fermented soybean be manufactured from organically grown soybeans and comprise about 50% of compositions. Fermented soybean powder may range from about 20% to about 80% of the total weight of compositions. Curcumin is preferable about 3% of Curcumin C3 Complex®), but may range from about 0.5 to about 6% based on the total weight of the composition. The equivalent amount of curcumin may be obtained from tumeric or other commercial curcumin products, but Curcumin C3 Complex® is especially preferred. Sucralose is preferably about 0.2%, but may range from about 0.1% to about 2.0% of the total weight of the composition. Stevia is preferably about 0.5%, but may range from about 0.1% to about 2.0% of the total weight of the composition. In power formulations, optionally, in addition to fermented soy; curcumin (Curcumin C3 Complex®), sucralose, and stevia ingredients, about 30-70%, preferably about 50%, (based on the total weight of the composition), of the ingredients of compositions of the invention are additional spices and herbs, especially spices and herbs earlier identified that are potential sources of NF-kB blockers.

The powder compositions of the invention can be formulated in any suitable product form. Such product forms include, but are not limited to liquid, aerosol spray, cream, dispersion, emulsion, foam, gel, lotion, ointment, powder, solid and solution. The present compositions preferably include a vehicle. A useful vehicle is one that is medically acceptable for ingestion or topical application. Useful vehicles may include, but are not limited to, one or more aqueous systems, glycerin, alcohols, fatty alcohols, fatty ethers, fatty esters, polyols, glycols, vegetable oils, mineral oils, water, fruit juices, cultured dairy products, (i.e., yogurt), dairy products (i.e, milk), carbonated or uncarbonated beverages. The powder compositions of the invention may be conveniently incorporated into a variety of liquids or solid compositions including, but not limited to, powders and other solids, liquid beverages (teas, mineral water, milk and other dairy products), capsules, tablets, ointments, skin creams, personal care products, pastas, soups, nutrient bars, cookies and other bakery items, etc.

A representative example of a powder formulation is shown in Example 1 below.

Example 1

Preparation of Fermented Soy-Based Composition

Liquid HAELAN 951® was dehydrated in a two step process thus providing a dry fermented soy ingredient. Organically grown soybeans were used to produce the aqueous HAELAN 951® material. In the dehydration process, HAELAN 951® is first heated under vacuum to remove up to 80% of the water. The concentrated liquid then, under pressure, is passed through a tube the end of which has multiple small holes (about 0.2-0.5 mm). The concentrated liquid coming out in a fog like state, and the tube is on top of a large container with hot air blowing over the top. When the fog-like liquid encounters the hot air, the remaining water of the concentrated will be vaporized. The dry fermented soy powder drops down into the container and is collected.

Commercial powder forms of the following ingredients were added and thoroughly mixed with the fermented soy powder: Curcumin C3 Complex®, BIOPERINE® (black pepper extract), *Piper longum*, ginger, cardamon long, cinnamon, Barley malt, soy lecithin, cocoa, chocolate powder, sucralose, and stevia. Curcumin C3 Complex® is a composition obtained from the Sabinsa Corporation (Piscataway, N.J., 08854) that has three main chemical compounds: curcumin, demehtoxycurcumin and bis-demethoxycurcumin that are collectively known as curcuminoids. BIOPERINE® is an extract from the fruit of black pepper (*Piper nigrum*) or long pepper (*Piper longum*) that contains 95% of piperine. The concentrations of the various ingredients are listed in Table 1 below:

TABLE 1

| Ingredient | % | Weight (mg) |
|---|---|---|
| Fermented Soy | 50.00 | 10,000 |
| Curcumin C3 Complex ® | 2.50 | 500 |
| BIOPERINE | 0.03 | 5 |
| Piper longum | 0.10 | 20 |
| Ginger | 0.10 | 20 |
| Cardamom long | 0.10 | 20 |
| Cinnamon | 1.50 | 300 |
| Other ingredients: | | |
| barley malt | 17.48 | 3,495 |
| soy lecithin | 15.00 | 3,000 |
| cocoa | 5.00 | 1,000 |
| chocolate powder | 7.50 | 1,500 |
| sucralose‡ | 0.20 | 40 |
| stevia† | 0.50 | 100 |
| | 100 | 20,000 |

The color of the composition is a light brown.
Possible Ingredient Ranges:
‡10-150 mg
†10-100 mg Although the present invention describes in detail certain embodiments, it is understood that variation and modifications exist known to those skilled in the art that are within the invention. Accordingly, the present invention is intended to encompass all such alternatives, modifications and variation that are within the scope of the invention as set forth in the following claims.

What is claimed is:

1. A dietary supplement composition comprising:
fermented soy, wherein said fermented soy comprises soy fermented with *Stenotrophomonas* or soy fermented with *Stenotrophomonas maltophilia*, and wherein said fermented soy is a powder;
curcumin, in an amount from about 0.5 wt. % to about 20 wt. % of said composition effective to provide nutritional benefits, wherein said curcumin further comprises demethoxycurcumin and bis-demethoxycurcumin;
at least one sweetener ingredient, wherein said at least one sweetener ingredient is an admixture of stevia and sucralose; and
at least one other plant ingredient, or extract thereof, wherein said at least one other plant ingredient, or extract thereof, is an admixture of:
(a) black pepper (*Piper nigrum*), long pepper (*Piper longum*), or a combination thereof selected from:
  (i) *Piper nigrum*, *Piper nigrum* extract, *Piper nigrum* and its extract, or a high piperine content *Piper nigrum* extract with a piperine content of 95 wt. % of the high piperine content *Piper nigrum* extract;
  (ii) Piper longum, *Piper longum* extract, *Piper longum* and its extract, or a high piperine content *Piper longum* extract with a piperine content of 95 wt. % of the high piperine content *Piper longum* extract; or
  (iii) *Piper longum/Piper nigrum*, *Piper longum/Piper nigrum* extract, *Piper longum/Piper nigrum* and their extract, or a high piperine content *Piper longum/Piper nigrum* extract with a piperine content of 95 wt. % of the high piperine content *Piper longum/Piper nigrum* extract;
(b) ginger;
(c) cardamom long;
(d) cinnamon;
(e) barley malt;
(f) soy lecithin;
(g) cocoa; and
(h) chocolate powder.

2. A dietary supplement composition comprising:
fermented soy, wherein said fermented soy comprises from about 0.5 wt. % to about 90 wt. % of said composition, said fermented soy comprises soy fermented with *Stenotrophomonas* or soy fermented with *Stenotrophomonas maltophilia*, and said fermented soy is a powdered material prepared by a process comprising:
(a) heating a liquid fermented soy material at a pressure below atmospheric pressure to produce a concentrated fermented soy material;
(b) passing the concentrated fermented soy material through a perforated tube under pressure to produce an aerosolized fermented soy material; and
(c) passing the aerosolized fermented soy material through a stream of hot air to precipitate the fermented soy powder;
curcumin, wherein said curcumin comprises from about 0.5 wt. % to about 20 wt. % of said composition, and said curcumin further comprises demethoxycurcumin and bis-demethoxycurcumin;
at least one sweetener ingredient, wherein said at least one sweetener ingredient comprises from about 0.1 wt. % to about 2.0 wt. % of said composition and said at least one sweetener ingredient comprises stevia and sucralose;
at least one additional plant ingredient or extract thereof, wherein said at least one additional plant ingredient or plant part or extract thereof comprises from about 0.1 wt. % to about 20 wt. % of said composition and said at least one additional plant ingredient or extract thereof is an admixture of:
ginger, cardamom long, cinnamon, barley malt, soy lecithin, cocoa, chocolate, and
an ingredient selected from the group consisting of black pepper (*Piper nigrum*), long pepper (*Piper longum*), *Piper nigrum* extract, *Piper longum* extract, a high piperine content *Piper nigrum* extract with a piperine content of 95 wt. % of the high piperine content *Piper nigrum* extract, a high piperine content *Piper longum* extract with a piperine content of 95 wt. % of the high piperine content *Piper longum* extract, a high piperine content *Piper longum/Piper nigrum* extract with a piperine content of 95 wt. % of the high piperine content *Piper longum/Piper nigrum* extract and a combination thereof; and
a pharmaceutically or cosmetically acceptable carrier, wherein said carrier comprises from about 0.5 wt. % to about 90 wt. % of water, based on the total weight of the composition.

3. A dietary supplement composition comprising:

| Ingredients: | wt. % | Weight (mg) |
|---|---|---|
| Fermented Soy | 50.00 | 10,000; |
| Curcumin, demethoxycurcumin and bis-demethoxycurcumin | 2.50 | 500; |
| Extract of Piper nigrum/Piper longum with 95 wt. % piperine content based on the total weight of the extract | 0.03 | 5; |
| Piper longum | 0.10 | 20; |
| Ginger | 0.10 | 20; |

17
-continued

|  | wt. % | Weight (mg) |
|---|---|---|
| Cardamom long | 0.10 | 20; |
| Cinnamon | 1.50 | 300; |
| Additional ingredients: | | |
| barley malt | 17.48 | 3,495; |
| soy lecithin | 15.00 | 3,000; |
| cocoa | 5.00 | 1,000; |
| chocolate powder | 7.50 | 1,500; |

18
-continued

|  | wt. % | Weight (mg) |
|---|---|---|
| sucralose | 0.20 | 40; |
| stevia | 0.50 | 100; |
|  | 100 | 20,000; | wherein said fermented soy comprises soy fermented with *Stenotrophomonas* or soy fermented with *Stenotrophomonas maltophilia*, and wherein said fermented soy is a powder.

\* \* \* \* \*